United States Patent [19]

Douglas et al.

[11] Patent Number: 4,788,657
[45] Date of Patent: Nov. 29, 1988

[54] COMMUNICATION SYSTEM HAVING RECONFIGURABLE DATA TERMINALS

[75] Inventors: Neal M. Douglas, Middletown; Kenneth M. Keverian, Westfield; Michael J. Miracle, Holmdel; Gerald H. Smith, Freehold, all of N.J.

[73] Assignees: American Telephone and Telegraph Company, New York, N.Y.; AT&T Information Systems, Inc., Morristown, N.J.

[21] Appl. No.: 941,568

[22] Filed: Dec. 12, 1986

Related U.S. Application Data

[63] Continuation of Ser. No. 565,744, Dec. 27, 1983, abandoned.

[51] Int. Cl.⁴ .............. G06F 13/14; G06F 13/10; G06F 9/06
[52] U.S. Cl. ........................... 364/900; 379/90; 379/242
[58] Field of Search ... 364/200 MS File, 900 MS File, 364/200, 900; 379/65, 90, 94, 96, 242, 245, 258

[56] References Cited

U.S. PATENT DOCUMENTS

| | | | |
|---|---|---|---|
| 3,618,031 | 11/1971 | Kennedy et al. | 364/200 |
| 3,676,858 | 7/1972 | Finch et al. | 364/200 |
| 3,920,975 | 11/1975 | Bass | 364/900 X |
| 4,051,326 | 9/1977 | Badagnani et al. | 364/900 X |
| 4,093,981 | 6/1978 | McAllister et al. | 364/200 |
| 4,215,243 | 7/1980 | Maxwell | 364/200 X |
| 4,254,462 | 3/1981 | Raymond et al. | 364/200 |
| 4,291,198 | 9/1981 | Anderson et al. | 364/900 X |
| 4,346,440 | 8/1982 | Kyu et al. | 364/200 |
| 4,389,720 | 6/1983 | Baxter et al. | 370/62 |
| 4,403,303 | 9/1983 | Howes et al. | 364/900 |
| 4,425,664 | 1/1984 | Sherman et al. | 375/8 |
| 4,443,861 | 4/1984 | Slater | 364/900 |
| 4,456,972 | 6/1984 | Lee et al. | 364/900 |
| 4,509,167 | 4/1985 | Bantel et al. | 370/62 |
| 4,516,200 | 5/1985 | Thompson | 364/200 |
| 4,631,666 | 12/1986 | Harris et al. | 364/200 |
| 4,688,170 | 8/1987 | Waite et al. | 364/200 |

FOREIGN PATENT DOCUMENTS

522384  11/1979  Australia .

OTHER PUBLICATIONS

U.S. patent application Ser. No. 464,057, Fulcomer et al, filed Feb. 4, 1983.
U.S. patent application Ser. No. 464,058, Nici et al, filed Feb. 4, 1983.
U.S. patent application Ser. No. 538,158, Marzec et al, filed Oct. 3, 1983.

Primary Examiner—Gareth D. Shaw
Assistant Examiner—Paul Kulik
Attorney, Agent, or Firm—John A. Caccuro

[57] ABSTRACT

The disclosed communication system enables communications between reconfigurable data terminals and a variety of connected computers, having dissimilar operating parameters, by automatically reconfiguring the operating parameters of the calling terminal to match those of the called computer. The system controller, in response to receiving the dialed number of the called computer from the calling terminal, accesses its memory for the operating parameters of the called computer and transmits these operating parameters to reconfigure the calling terminal. Another embodiment enables the operating parameters of a terminal to be reconfigured in any of a number of operating modes in response to a reconfiguration request signal sent to the system controller from the terminal.

11 Claims, 7 Drawing Sheets

S-CHANNEL MESSAGE SET

| | MESSAGE TYPE (313) | GROUP IDENTIFIER (314) | | INFO FIELD (315) |
|---|---|---|---|---|
| 301 | OFF-HOOK | 10 | 00000 | A1 |
| 302 | ON-HOOK | 10 | 00000 | A2 |
| 303 | DIALED ASC II DIGIT | 11 | 00100 | A3 |
| 304 | BUFFER STEP | 00 | 00011 | A4 |
| 305 | BUFFER SCROLL | 00 | 00011 | A5 |
| 306 | DIAL TONE APPLICATION | 00 | 00000 | A6 |
| 307 | TONE REMOVAL | 00 | 00000 | A7 |

| USER | ORIGINATION TERMINATION | SWITCH PROCESSOR (SP) | DESTINATION COMPUTER |
|---|---|---|---|
| 501 PRESS CALL KEY | OFF HOOK → | | |
| 502 | | ← DIAL MESSAGE | |
| 503 | DISPLAY DIAL MESSAGE | | |
| 504 ENTER TEL NO. OF DESTINATION | DIALED ASCII DIGIT → | ACCUMULATE RECEIVED DIGITS & VERIFY DESTINATION (FIG. 7) | |
| 505 BACKSPACE | DIALED ASCII BACKSPACE → | | |
| 506 PRESS "CR" KEY | DIALED ASCII CR DIGIT → | | |
| 507 | | RINGER ON → | |
| 508 | ← DISPLAY RINGING | ← RINGBACK & RINGING | |
| 509 | | TERMINAL ← CONFIGURATION MESSAGE | |
| 510 | | | ← OFF-HOOK |
| 511 | ← DISPLAY ANSWERED | ← RINGBACK REMOVED- ANSWERED/RINGER-OFF → | |
| 512 | ← HANDSHAKE → | | ← HANDSHAKE → |
| 513 | ← DATA COMMUNICATIONS | | → |
| 514 DISCONNECT | ← DISPLAY DISCONNECT | | |
| 515 | ON-HOOK → | DISCONNECT → | |

| 801 | 1 | SPEED | 0 | 1200 bps (DEFAULT) |
| | | | 1 | 2400 bps |
| | | | 2 | 4800 bps |
| | | | 3 | 9600 bps |
| | | | 4 | 19200 bps |
| 802 | 2 | DUPLEX | 0 | FULL (DEFAULT) |
| | | | 1 | HALF |
| 803 | | SEND PARITY | 0 | EVEN (DEFAULT) |
| | | | 1 | ODD |
| | | | 2 | MARK |
| | | | 3 | SPACE |
| 804 | | CHECK PARITY | 0 | NO (DEFAULT) |
| | | | 1 | YES |
| 805 | | CLOCK | 0 | ASYNCHRONOUS (DEFAULT) |
| | | | 1 | ISOCHRONOUS |
| 806 | 24 | ANSWERBACK | 0-69 | UP TO 69 ASC II CHARACTERS FOLLOW FINAL 0 OR DEFAULT IS EMPTY STRING |

· · ·
· · ·
· · ·

COMMUNICATION SYSTEM HAVING RECONFIGURABLE DATA TERMINALS

This application is a continuation of application Ser. No. 565,744, filed Dec. 27, 1983, now abandoned.

TECHNICAL FIELD

This invention relates to a communication system for controlling communications between a variety of connected data communication devices and, more particularly, to a method and apparatus for establishing compatible communications between a reconfigurable data terminal and other data devices having different operating parameters.

BACKGROUND OF THE INVENTION

Existing data terminals can operate in any of several operating modes which are established by the user setting parameters, such as duplex/simplex, synchronous/asynchronous, parity, etc. The terminal operating mode must be set by the user to enable compatible communicatin with a computer system. In many communication systems, these data terminals are time-shared among several types of computer systems each having different operating parameters. In such a communication system, the user must check the terminal configuration and reconfigure the terminal if necessary to enable communication with a different computer system type.

To overcome this burdensome and technically complicated process of manual reconfigration by the user, one prior art system described by Finch et al in U.S. Pat. No. 3,676,858, issued on July 11, 1972, uses automatically reconfigurable computer ports. In Finch et al the coding and transmission rate of the computer port is set after an electrical connection is established with a remote terminal and after receiving and analyzing a single standard character sent at the transmission rate at which the terminal is configured.

One problem with the Finch et al arrangement is that since most of the operating modes available in todays terminals, such as parity setting, number of stop bits, character/block transfer, etc., are not detectable by analyzing the signal characteristics of the standard character received at the computer port, the Finch et al technique would not work. Consequently, the computer port must be manually reconfigured to enable compatible communications with many of the newer terminals. An additional limitation of the Finch et al arrangement is that the coding and transmission rate of the computer port cannot be set until after a connection is established and the terminal sends the standard character.

Thus, there is a continuing need in the art to provide a method and apparatus for automatic reconfiguration of a communication system to enable compatible communications between terminals and various types of computer equipment connected to the system.

SUMMARY OF THE INVENTION

The present invention provides a method and apparatus for enabling compatible communications between a terminal having reconfigurable operating parameters and various types of communication devices (e.g., computers). According to the present invention the terminal sends one of a number of terminal reconfiguration signals to a communication system controller each identifying a specific reconfiguration request and in response thereto the controller selects and transmits a predetermined reconfiguration command defining one or more operating parameters to be reconfigured at the terminal. The terminal receives the command and reconfigures itself according to the operating parameters contained therein.

According to one embodiment of the present invention in a communication system including a terminal, a controller and a plurality of communication devices switchably connectable to the terminal, the calling terminal sends a dialing reconfiguration signal to the controller specifying the device or group of devices to which compatible communications is requested. In response thereto the controller selects and sends a reconfiguration command to the terminal specifying one or more operating parameters to reconfigure the terminal to enable compatible communication with the specified device or group of devices.

BRIEF DESCRIPTION OF THE DRAWING

The detailed description of the invention will be more fully appreciated from the illustrative embodiment shown in the drawing, in which.

GENERAL DESCRIPTION

Figure 1:
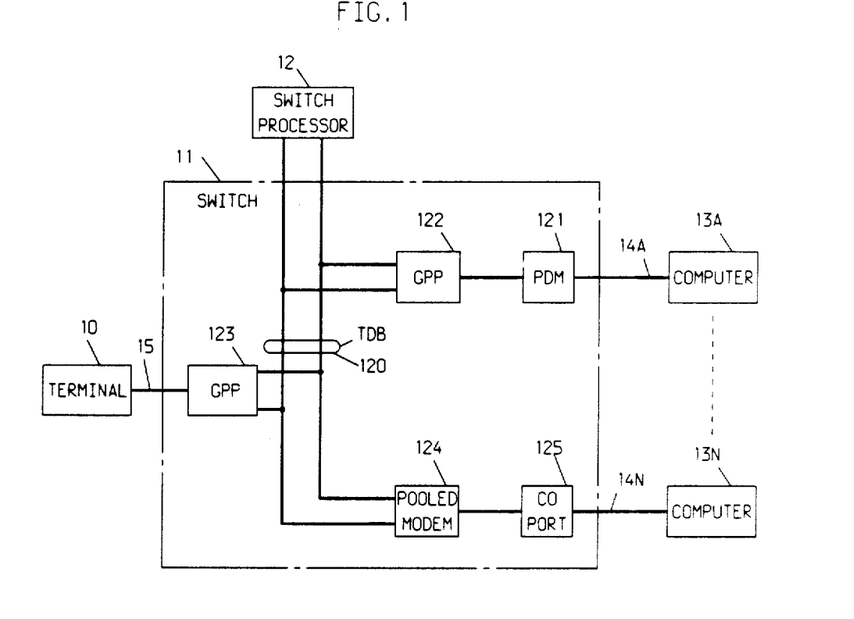
FIG. 1 is a block diagram of a communication system including a terminal, switch, processor, controller, and connected computer systems.

FIG. 1 illustrates a general block diagram of the disclosed communication system including terminal 10, communications switch 11, controller (switch processor) 12, and connected communication devices (computer systems) 13A through 13N. Terminal 10 connects through switch 11 to one of several available computers 13A–13N under control of a switch processor 12. Computers 13A–13N may be part of or co-located with switch 11 or remotely located (reached through trunk or central office lines 14A–14N). Communications between terminal 10 and any of the computers 13A–13N may require terminal 10 to be reconfigured to match the communications parameters of the called computer.

It should be understood that the disclosed remote terminal configuration method and apparatus is not limited to terminal - computer communications. Using this invention, terminals may be configured to connect with other terminals, intelligent workstations, personal computers, information service bureaus, data switches, modems and line adapter units, etc. Moreover, while the disclosed embodiment uses a dialing signal from the calling terminal as a reconfiguration signal it should be understood that other signals from the terminal can be used to initiate a terminal reconfiguration request. For example, a character mnemonic entered by the terminal user could also be used as the reconfiguration signal.

Returning to FIG. 1, the user at terminal 10 initiates a connection by dialing the desired computer from the terminal 10 keyboard (using typed digits or character mnemonics). These dialing messages pass to switch processor 12 over the control channel of switch 11. Switch processor 12 then rings the called computer. Additionally, switch processor 12, based on the computer dialed, looks up in a table containing the operating parameters of all of the connected computers to select the appropriate operating parameters required for terminal 10 to communicate with the dialed computer. Prior to the called computer answering the call, switch processor 12 sends a reconfiguration command (control message) to terminal 10 containing these communication parameters. Obviously, the control message could also be sent to terminal 10 after an answer by the called computer. On reception of this control message, terminal 10 configures its operating parameters. Thereafter, switch processor 12 completes the set up of the call between the terminal 10 and the dialed computer and communications proceed.

It should be noted that according to the present invention non-communication terminal specific parameters such as page/scroll mode, number of columns, cursor, keyclick, margin bell, return key, etc. can be automatically configured or reconfigured into terminal 10 in response to a predetermined command sent from switch processor 12. Thus, these parameters need not be set up manually by the operator. Such a reconfiguration may be used by the terminal user when doing tasks such as text processing, data base management, etc. which do not require interaction with other data communication devices.

The communication switch 11 may include a time division dual bus 120 which interconnects processor data module (PDM) 121, general purpose ports (GPP) 122 and 123, modem 124 and central office (CO) ports 125 under control of switch processor 12. A local computer 13A connects to the system via PDM 121 and GPP 122 while a distant computer 13N connects to the system via CO port 125 and modem 124. Computer 13A may be co-located with switch 11 and communicate over facility 14A while computer 13N is located at a distance requiring connection via telephone line or trunk 14N.

It should be obvious that communication switch 11 can support multiple terminals 10, local computers 13A and distant computers 13N. Moreover, communication switch 11 need not be arranged in a bus structure but may be arranged in the standard loop, star interconnection, or multi-bus arrangements using other types of interface ports to support communications between the connected voice/data devices.

Terminal 10 may be a standard integrated voice/data terminal comprising a digital telephone set and a data terminal including a display, keyboard and controller. Terminal 10 communicates over 4-wire full duplex serial data facility 15 to GPP 123 using a well known standard Digital Communications Protocol (DCP).

Illustratively, in one embodiment, time division multiplex (TDM) bus 120 includes a pair of 8 bit parallel busses each having a data capability of 2.048M bits/sec, which is divided into 256 time slots, each of which can carry 8K bits/sec. The use of two busses allows up to 512 time slots. These time slots are allocated by switch processor (SP) 12, thereby creating data communication paths between system interface ports (GPP 122 and 123, modem 124 and SP 12). Five time slots are reserved as control channels to control data communications between the system components. The SP 12 uses these control channels to allocate/deallocate time slots.

The switch processor 12 controls the setup of calls or connections between equipment interfaced to the time division bus TDM. The SP 12 uses the first five time slots on the time division bus as a control channel to control the TDM bus and to communicate with the interface ports on the bus during call setup. The SP 12 communicates with the interface ports via the common control message set (CCMS) protocol. Digital communication protocol (DCP) S-channel messages can be sent and received from digital instruments that are interfaced by GPPs via the CCMS protocol.

Call sequencing, terminal management and network management software programs execute on SP 12. The call sequencing software controls the various phases of call setup. The terminal management software manages the ports of the switch and presents a common interface, for the various types of equipment interfaced to the switch, to the call sequencing software. The network management software abstracts the switching characteristics of the bus to the call sequencing and terminal management software. Only the software relevant to the implementation of this invention is described here.

Illustratively, a call is established in the system of FIG. 1 as a result of a user stimuli at terminal 10 which is received by switch processor 12 via GPP 123 and switch 11 over the control channel. Switch processor 12 establishes which time slots are to be used for the call and sends a response signal back over the control channel to GPP 123. GPP 123, which is also processor controlled, then programs itself for data communications using the allocated transmit and receive time slots for the duration of the call.

Switch processor 12 may be a standard microprocessor in which the various control functions (call sequencing, terminal management, and network management) are programmed in a read-only-memory (ROM) and which includes temporary storage random-access-memory (RAM) utilized by these control functions. General purpose ports (GPP) 122 and 123 interface of the TDM bus 120 to the formats utilized on facilities 14A and 14N, respectively. Modem 124 converts the format of data on the TDM bus 120 into a CO line format and vice versa. Central office port circuit 125 interfaces CO line 14N to the TDM bus. Processor data module PDM 121 converts in a standard manner data in the DCP format of GPP 122 to/from the format of computer 13A.

The embodiment and operation of switch processor 12, switch 11 and GPP 122 and 123 can be similar to the embodiment and operation of the system controller time division bus and system controller described in U.S. Pat. No. 4,389,720 issued to L. E. Baxter et al on June 21, 1983.

DETAILED DESCRIPTION

Figure 2:
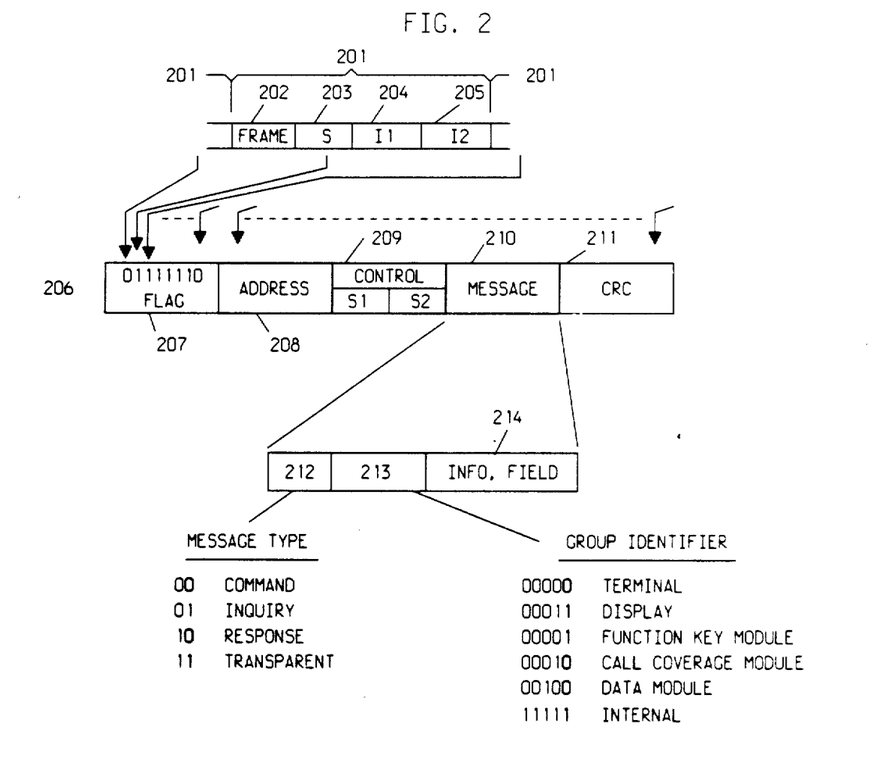
FIG. 2 illustrates the data frame format and the S bit frame format utilized, respectively, for the data and S channel data transmissions between the terminal and computer systems.

Before describing the detailed operation of the present invention, some background on the digital communication protocol (DCP) used to control information exchange between terminal 10 and GPP 123 will be described. With reference to FIG. 2, there is shown in 201 the data format for the DCP. Basically, the DCP protocol controls facility 15 to provide essentially error-free data transmission between terminal 10 and GPP 123. Each DCP data frame includes framing bits 202, signaling bit (S) 203 and two time separated information channels I1 and I2 (204 and 205) for transmitting information on a single pair of wires, i.e., facility 15. Typically, one channel I1 is used to carry eight bit digital voice signals to and from terminal 10 while channel I2 is used to carry eight bit digital data signals to and from terminal 10. The S bit, 203, provides a communication channel, hereinafter the S-channel, for providing control signals between terminal 10 and GPP 123 to control the information transmission over channels I1 and I2.

The S-channel frame as shown in 206 is constructed from the S-bit of consecutive DCP data frames (201). The S-channel frame 206 is arranged in a standard format including an eight bit flag 207, an eight bit address 208, an eight bit control word 209, a non-fixed bit length message field having a variable length 210, and a sixteen bit cyclic redundancy code (CRC) 211. During the exchange of S-bit frames 206 of data between terminal 10 and GPP 123, the CRC bits are checked to make sure that the frame is received without transmission errors. Control bits 209 tell terminal 10 and GPP 123 whether the message field (210) is to be decoded as an information command 212 or as supervisory command or response. A more detailed description of the S-channel data frame is included in U.S. application Ser. No. 538,158, by Marzec et al, Case 1-5-4-2-6, filed on Oct. 3, 1983, and U.S. patent application Ser. No. 464,058, by Nici et al, Case 2-4-3, filed on Feb. 4, 1983 now U.S. Pat. No. 4,512,017, issued Apr. 16, 1985.

Terminal 10 and GPP 123 use, in a well-known manner, the S-channel supervisory commands and responses for facility control functions which involve functions such as initialization of facility 14A, and detection and recovery from transmission errors. For example, the use of these supervisory commands and responses to establish a communication connection is described in U.S. patent application Ser. No. 464,057, by Fulcomer et al, Case 4-1-1-3-2-2, filed on Feb. 4, 1983 now U.S. Pat. No. 4,512,016, issued Apr. 16, 1985.

Figure 3:
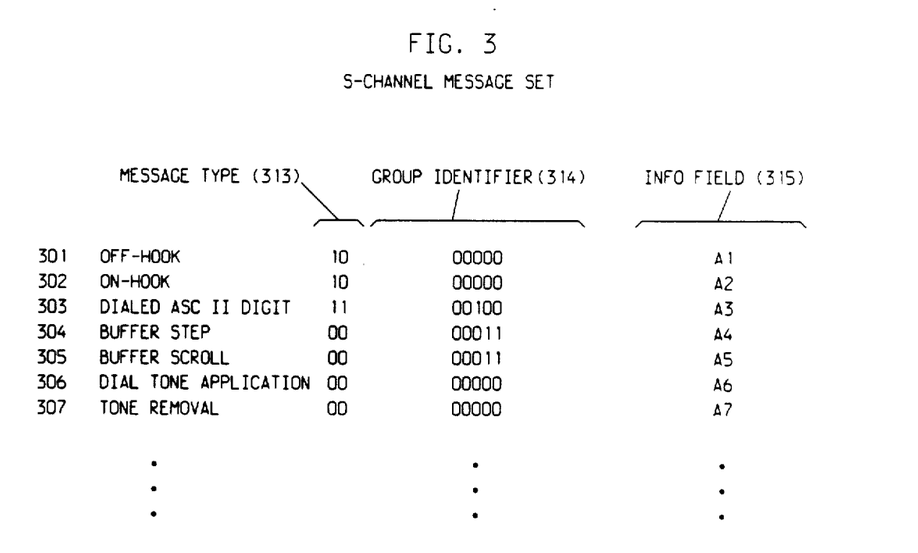
FIG. 3 shows an illustrative format of some of the S channel message set.

When the message field of the S-channel frame contains an information command rather than a supervisory command and response, it is decoded into a message type 212, group identifier 213, and information field 214. This information command is used to transmit device level, i.e., terminal messages, between terminal 10 and GPP 123 and switch processor 12. These terminal messages include button depression information, switch-hook state changes, lamp status and display messages. An illustrative subset of some of the messages used with the present invention are illustrated in FIG. 3.

Figure 4:
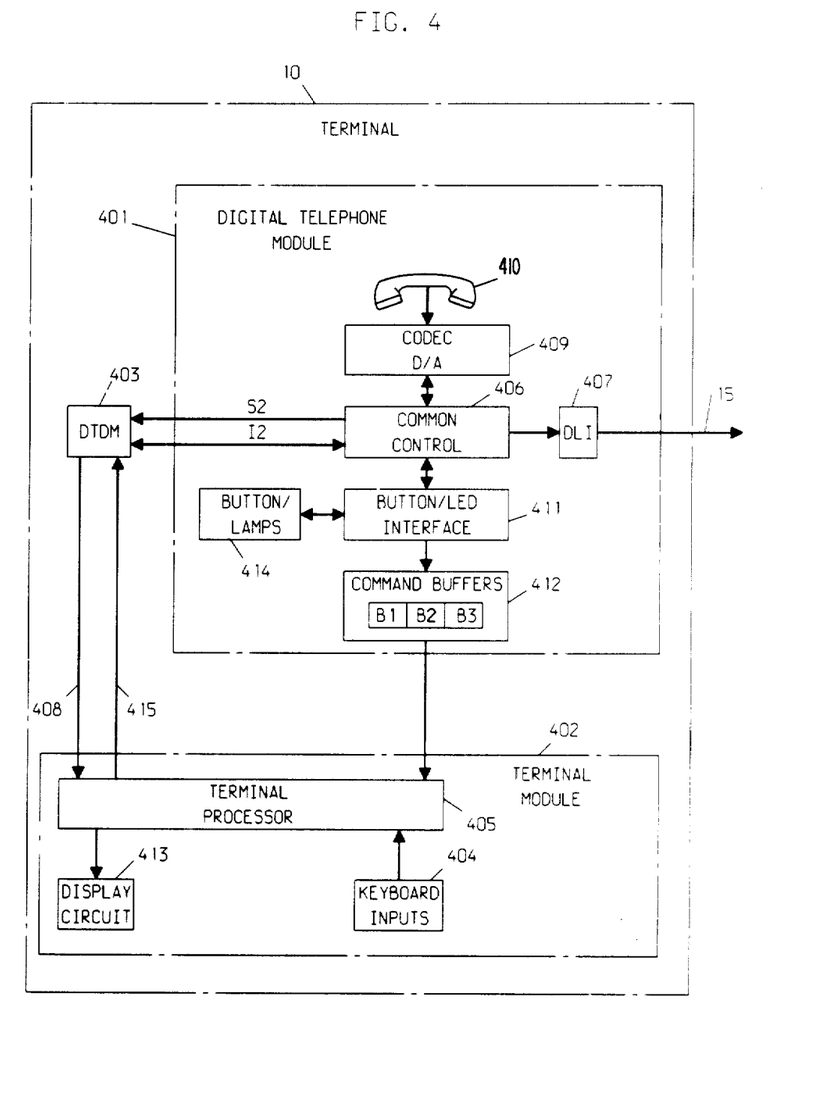
FIG. 4 shows a block diagram of a terminal in accordance with the present invention.

FIG. 4 illustrates a block diagram of terminal 10 including digital telephone module 401, display/keyboard terminal 402, and digital telephone data module (FD..DTDM) 403. The operation of digital telephone module 401 and DTDM 403 are more fully described in the above-identified Marzec et al patent application which is incorporated by reference herein.

With reference to FIG. 1, assume that a user at an electrically reconfigurable terminal 10 wants to communicate with a computer 13A. Before communication can commence, terminal 10 must be configured to have the same operating mode as computer 13A. Thus, terminal 10 must be configured so that operating parameters such as simplex/duplex, synchronous/asynchronous, parity, bit rate, etc. are compatible with those parameters of computer 13A, to insure compatible communications therewith.

With joint reference to FIGS. 2, 3, 4 and 6, the operation of the present invention will be described. In the description that follows, the first digit of a reference number indicates the Figure which contains the referenced number.

Figure 5:
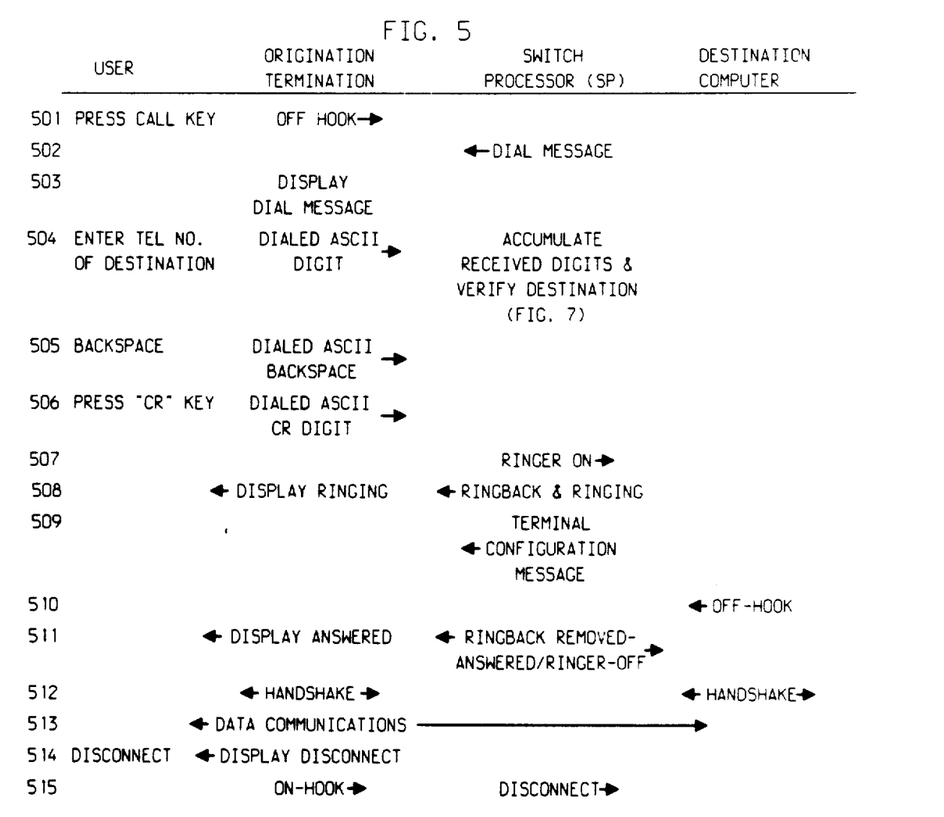
FIG. 5 illustrates the dialog of communications between the origination terminal, switch processor and destination computer.

When terminal module 402 is turned on a Data Terminal Ready lead (not shown) of bus 415 goes high and in response DTDM 403 sets the send and data set leads (not shown) high on data bus 408. A user at terminal 10 initiates a call by pressing a "call" or "break" key causing an off-hook signal to be sent, in step 501, to switch processor 12. In FIG. 4, the operation of Call key provides a keyboard input 404 which is detected by terminal processor 405 which signals digital terminal data module (DTDM) 403 over bus 415. DTDM 403 sends an "off-hook" message to common control 406 which sends the off-hook signal over facility 15 via digital link interface (DLI) 407. This off-hook signal is an information command transmitted by digital terminal 10 to switch processor 12 indicating that a user at terminal 10 is about to begin dialing.

Thereafter, DTDM 403 imposes a carriage return and line feed character on the receive channel 408 to terminal processor 405 which causes data terminal circuit 405 to place the cursor of display circuit 413 on a new line.

With reference to FIGS. 2 and 3, the off-hook message is encoded by common control 406 into the information field 214 along with the appropriate message type 212 and group identifier codes. An illustrative format for an off-hook message is shown in 301, where information field (315) parameter A1 is a multiple bit binary number. The format for an off-hook message is shown in 301. As shown in FIG. 2, the resulting S-channel message (I), 210, is transmitted as S-bits one at a time, 203, in consecutive DCP data frames, 201.

Figure 6:
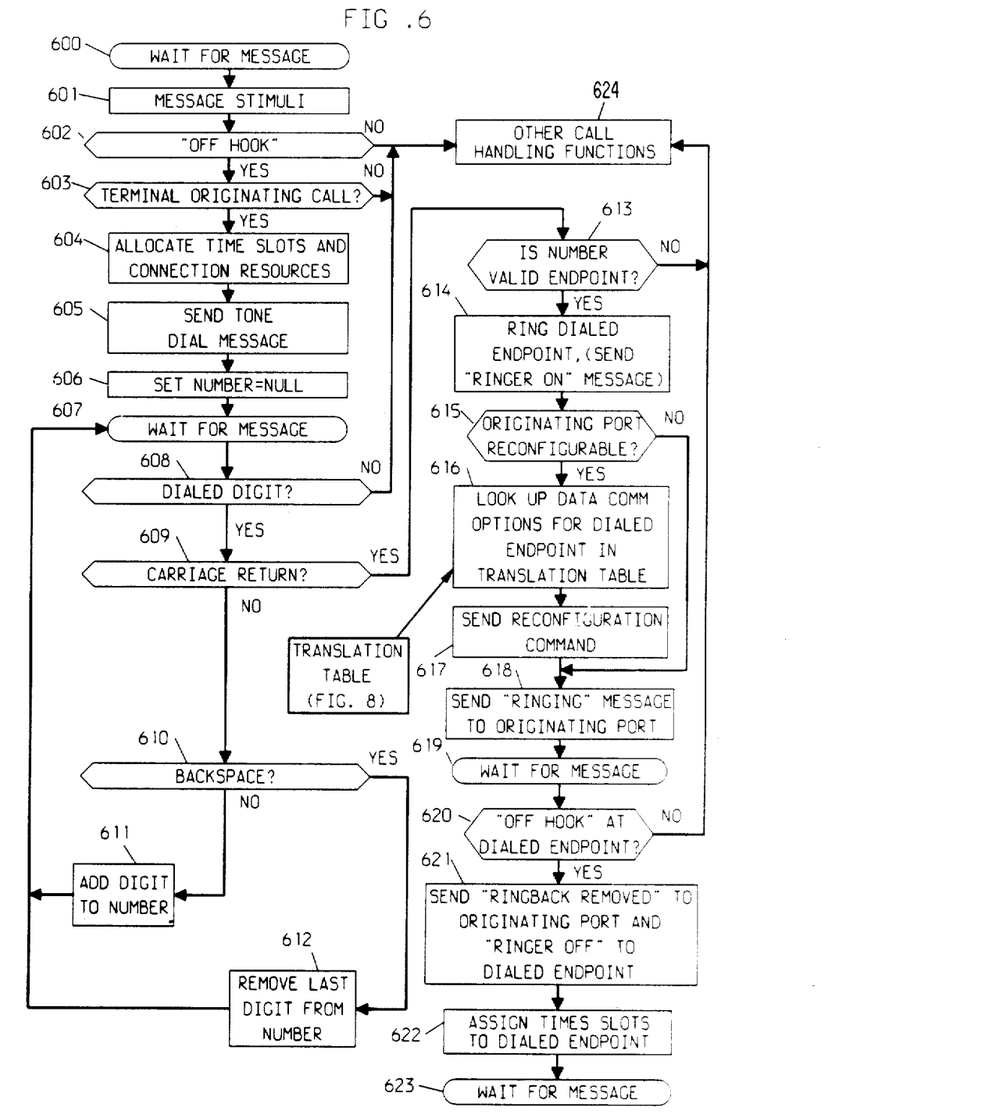
FIG. 6 shows a flow chart of the operations of the switch processor.

With reference to FIG. 6, the terminal management program of switch processor 12 is responsive to dialing signals received from terminal 10 for selecting the device 13A-13N to which compatible communication is requested and for transmitting a predetermined reconfiguration command specifying the operating parameters of terminal 10 to be reconfigured. Initially the terminal management program is in idle state 600. Switch processor 12 receives, 601, and decodes the received S-channel off-hook message, 602. If the message is not an off-hook message, one of the other call handling functions 624, is performed, which function is not relevant to the present invention and will not be described herein.

Assuming that an off-hook has occurred, a determination is made whether terminal 10 is originating a call, 603. If not, one of the other call handling function, 624, is performed. A call origination is determined by checking the message channel. If a call origination has occurred, time slots (in message fields I1 and I2 of FIG. 2) and network connection resources are allocated to the impending call. Thereafter, a text message DIAL in ASCII format is inserted in information field (214 of FIG. 2). The format of this tone application signal is shown in 302 of FIG. 3. The dialed number buffer is then nulled, 606, and switch processor 12 prepares to receive messages 607 containing the dialed digits from terminal 10.

Returning to FIG. 4, DLI 407 and common control 406 receives and decodes the message field. The message field of S-channel frame 206 is sent to keyboard/LED interface 411 which decodes the message for output to 40-character command buffer 412. Terminal processor 405 receives the signal from buffer 412 and causes display circuit 413 to output the text message DIAL to the user (503 of FIG. 5).

With joint reference to FIGS. 4 and 5, after receiving the DIAL message 503, the user in step 504 enters or dials the telephone number or identification code of the called computer system via keyboard input 404. In the disclosed embodiment this dialing circuitry provides the means for generating and transmitting a reconfiguration signal to switch processor 12. Terminal processor 405 passes this dialed character keyboard input data to DTDM 403. DTDM 403 packages a predetermined number of dialed characters as ASCII digits in message field (210 of FIG. 3), which is then transmitted over facility 15. DTDM 403 also imposes the dialed character on the received I2 message field (205 of FIG. 2) which is sent over bus 408 to terminal processor 405. Placing the characters in the received I2 message field causes the character to appear on display circuit 413 as the keyboard input 404 are entered by the user.

With reference to FIGS. 2 and 3, the dialed ASCII digit is inserted in message I in format 210 with transparent message type (212), terminal identifier (213), and one or more ASCII characters in information field 214. The format of this transparent message is shown in 303 of FIG. 3. This transparent message is transported from terminal 10 to switch processor 12.

Returning to FIGS. 4 and 5, DTDM 403 may package more than one of the detailed ASCII digit messages in information field (214 of FIG. 2) up to a limit defined by hardware buffering circuits. If the limit is reached, DTDM 403 sends a second message field (210 of FIG. 2) to switch processor 12 with the remaining dialed characters. Note, if the user enters an erroneous character and then enters a backspace and the correct character, DTDM 403 likewise sends the erroneous character, the backspace, and the correct character, as shown in step 505.

At the completion of dialing, the user enters a carriage return which causes DTDM 403 to send the remaining dialed characters in the last message I (210) to switch processor 12. This step is shown by step 506. This carriage return, besides indicating the end of the dialed number, also indicates to DTDM 403 that further characters received from terminal 10 are to be transmitted over the I2 message field (205 of FIG. 2).

Returning to FIG. 6 again, switch processor 12 receives messages 607 and determines if they are dialed digits, 608. If not a dialed digit another message handling function is performed. If the dialed digit received, 609, is a carriage return, then the program in FIG. 6 knows that the dialing process at terminal 10 is completed and the validity of the dialed number is checked, 613. If no carriage return signal was received a check is made to determine if the received digit is a backspace, 610. As noted previously, a backspace digit indicates that the last digit is erroneous and should be deleted, 612. Thereafter control returns to the digit message gathering step 607. If the received dialed digit is not a backspace the digit is added to the rest of the received digits of the dialed number, 611. Again control is returned to the digit message gathering step 607.

With joint reference to FIGS. 5 and 6, the call sequencing software program of switch processor 12 checks, 613, the received digits to see if the user has dialed a legitimate endpoint or called location (destination computer 13A-13N). If so, in step 614 (and 507) a ringing signal and ringer-on message is sent to the dialed destination computer. If the number is not a valid computer location 13A-13N address, then the other call handling function 624 is performed. Assuming a valid number dialed then in step 615, a determination is made to see if the originating port, terminal 10, can be reconfigured 615. If not then a ringback signal is sent to terminal 10 along with a ringing message to be displayed thereat, step 618 (also shown in 509).

Figure 8:
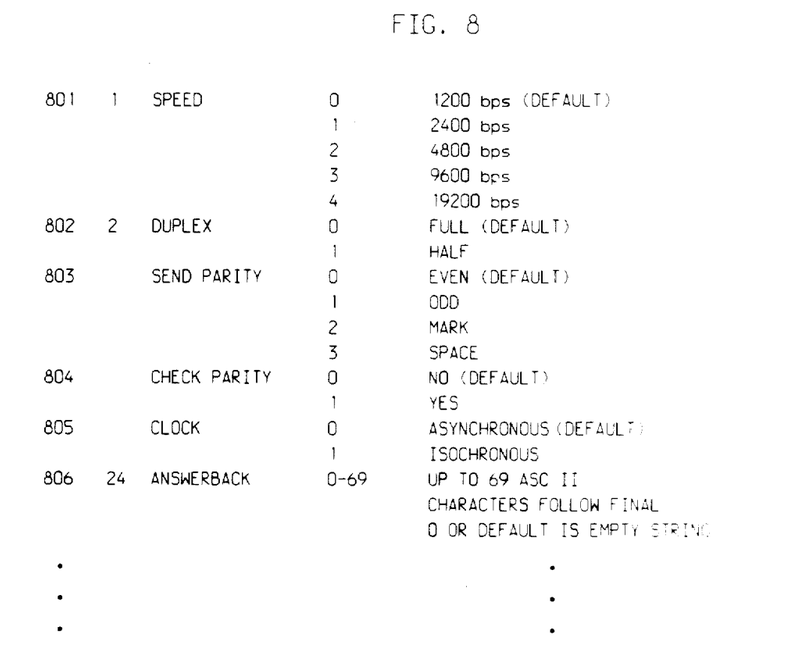
FIG. 8 illustratively shows a table listing some of the reconfigurable terminal parameters which can be established from commands from switch processor.

If terminal 10 can be reconfigured the translation table of FIG. 8 is accessed. Table 8 contains the data communication and operating parameters required for compatible communication with the dialed computer. The data of table 8 is accessesd using the dialed computer number. Thus, for example, if computer 13A was the dialed computer then operating parameter P1, 801 through 806, would be sent to reconfigure terminal 10. The value of each operating parameter is shown as P2 and has the range of possible values shown. Hence, the transmission at a rate (speed) can be set at a P2 value 0-4 representing, respectively, 1200, 2400, 4800, 9600 and 19200 bits per second (bps). Similarly the duplex parameter can be full or half; send parity, either even, odd, mark or space; check parity can be even or odd; and clock either asynchronous or synchronous. The answerback parameter indicates the number of characters that follow the final 0 or default is empty string.

Obviously, the parameters which can be reconfigured depend on the characteristics of the particular terminal 10 used in the system. When either computer 13B or computer 13N is dialed the associated parameters 807 and 808, respectively, are sent to reconfigure terminal 10 in a reconfiguration command, 617. The reconfiguration command is transparent message (212 of FIG. 2). After the reconfiguration command is sent to terminal 10, the ringback signal and RINGING message, 618, is sent to origination port (terminal 10). This is shown graphically in 508. When switch processor 12 sends, step 508, a ringback tone and RINGING message to terminal 10 a RINGING message is displayed on display circuit 413.

Assuming that the called destination computer location is local, i.e., 13A of FIG. 1, then if the data terminal ready lead from PDM 21 is on, the data module of GPP 122 turns on a ring indicator at PDM. If the called destination is not local, a pooled modem 124 converts the information into a format for transmission via CO port 125 and facility 14N to the dialed computer 13N.

Returning to FIG. 6 again, switch processor 12 in step 619 awaits an off-hook message from the called computer. When a message is received from the called computer, it is checked to determine if it is an off-hook message, 620. If not, the message is handled in step 612. If an off-hook message was received, a ringback removed signal, 621, to the originating or calling terminal (see also step 511 of FIG. 5). Thereafter, the program of FIG. 6 returns to the wait for message state, 622/600.

As noted above, switch processor 12 sends reconfiguration data in the form of a command to terminal 10. With reference to FIG. 3, two logical control channels S1 and S2 are multiplexed in control field 309. Control information for digital telephone module 401 and terminal module 402 is received in S1 while control information for DTDM 403 is received in S2. The S-channel control messages 210 arrive at terminal 10 from SP 12 encoded in the DCP format shown in 201. With reference to FIG. 4, DLI 407 receives the information from facility 15 and common control 406 separates the S-channel messages 210 from the S-channel data stream 206, sending S1 messages to keyboard/LED interface 411 and S2 messages to DTDM 403. Keyboard/LED interface further divides S1 messages into control messages for button/lamp unit 414 and display/terminal messages which are stored in command buffer 412.

Display/terminal messages are stored as ASCII characters in three 40 character buffers B1, B2 or B3 located in command buffer 412. These messages are always placed in the current buffer. Switch processor 12 determines which buffer B1-B3 is to receive the message using the buffer step and buffer scroll S-channel messages (304 and 305, respectively, of FIG. 4). The buffer step command 304 is a transparent command from switch processor 12 to terminal module 402 which sets the current buffer as the first buffer B1 of buffers B1-B3. The buffer scroll command 305 is a transparent command from switch processor 12 to terminal module 402 which enables the switch processor 12 to step through the buffers B1-B3. Switch processor 12 causes the reconfiguration command to be stored as new data in the third buffer B3 of command buffer 412. The reconfiguration command 508 may include various display control commands.

Figure 7:
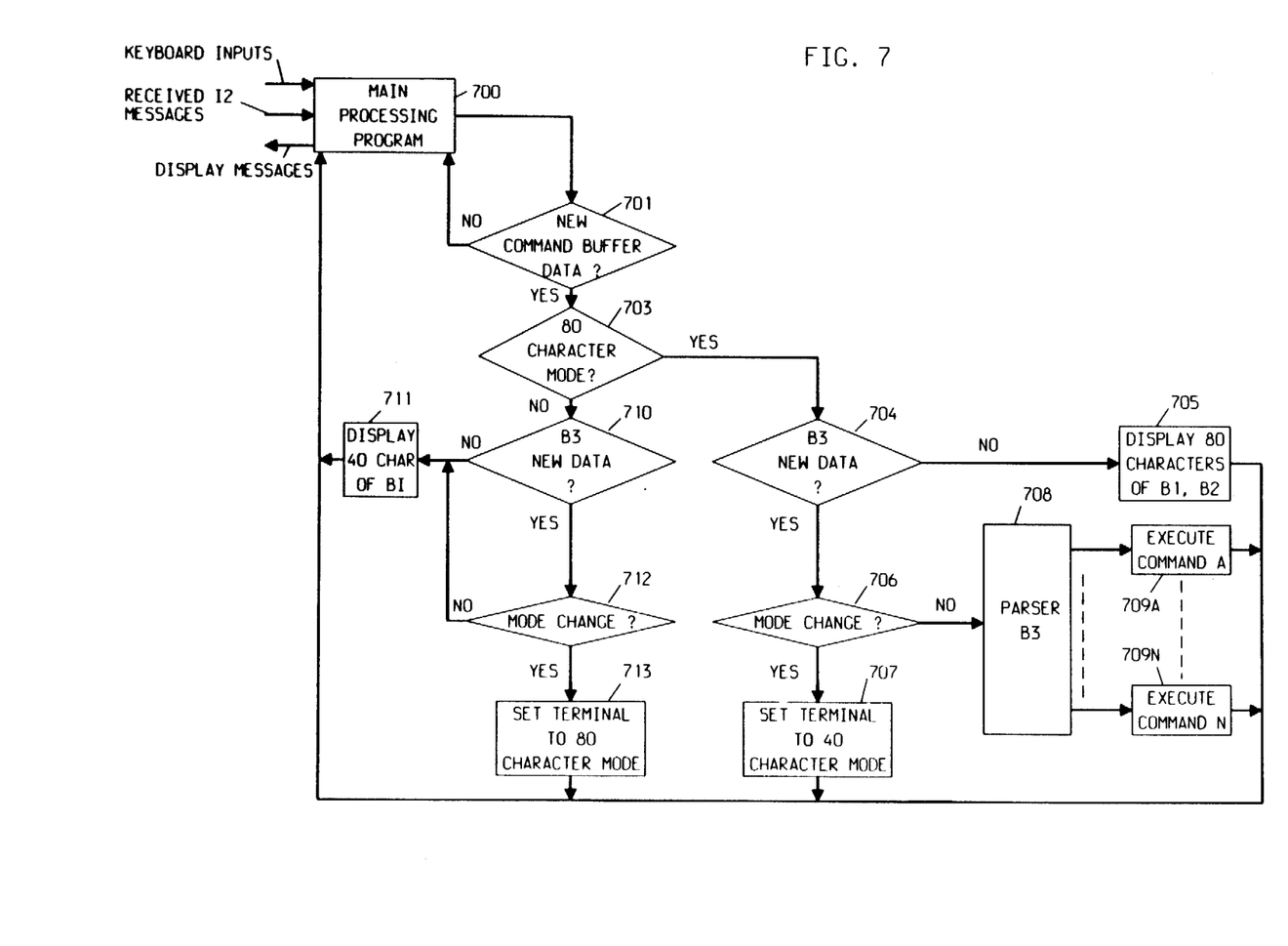
FIG. 7 shows a flow chart of the operations of the terminal.

FIG. 7 describes the operation of the reconfiguration means of terminal module 402 of terminal 10, in response to a reconfiguration command from switch processor 12. Terminal module 402 includes a terminal processor 405 which operates a standard processing program 700, responding to various stimulii such as keyboard key depressions 404, received I2 messages 408, outputting display commands to display circuit 413, etc. Periodically, main processing program 700 checks, 701, the content of the command buffer 412 for new data. If no new data has been stored in command buffer 412, control returns, 702, to the main loop 700. If new data has been received, a determination 703 is made if terminal module 402 is in the 80 character mode. Note, operation of terminal 10 in the 80 character mode enables the switch processor 12 to remotely configure terminal 10. Assuming that the 80 character mode was set, the contents of the third buffer B3 is checked, 704, for any new data. If no new data exists in buffer B3, the data in buffers one and two (B1 and B2, respectively) is processed, 705, for displaying on display circuit 413 (written to the dedicated S-channel message line). Control is then returned to main processing program 700. If buffer B3 contains new data, as during a reconfiguration command, the buffer B3 content is checked, 706, for a mode change request, bits 0-5. If a mode change was requested, 707, terminal 10 is set to the 40 character mode and control returned to the main processing program 700. If no mode change was requested, a standard ANSI 3.64 parser routine, 708, is entered, which separates the data in 40 character buffer B3 into several characters. This parser, 708, using the well-known ANSI 3.64 standard, determines what the command is and this command is executed to reconfigure the terminal in steps 809A-809N.

Shown in FIG. 8 is an illustrative list of some of the standard terminal options utilized by terminal 10. The illustrative set of terminal options shown in FIG. 8 include two parameters. The first parameter P1 identifies the specific option, the second parameter P2 indicates either the value of the first parameter or, for string options such as answerback, 806, the number of characters in the string. In the case of string options, the string follows the final character "P". The table shown in FIG. 8 indicates the assignment of parameter values to options and value selection. An omitted parameter for the option value defaults to the one shown for that option.

When switch processor 12 sends the terminal option command the parameters P1 and P2 are loaded into B3 of buffer 412. For example, with reference to 801, a first parameter value 1 indicates the data communication rate (speed) and the second parameter range of 0-4 indicates a data rate of from 1200 bits per second (bps) through 19200 bps. As indicated, if no second parameter existed the default speed would be 1200 bps. Other terminal parameters or options may include duplex 802, send parity 803, check parity 804, clock 805, memory access, return key, new line on line feed, autowrap, cursor, keyclick, margin bell, transmission size (character, line, block), line send, block send, send from, send edit sequence, send graphics, "enter" key, field separator, block terminator, lines per page, pagination, printer model, printer speed, flow control, printer alarm, main port and printer port. At terminal 10 the associated routine (one of 709A-709N0 of FIG. 7 reconfigures the terminal options to the options selected in buffer B3. The result is that terminal 10 is configured to operate in the mode selected by switch processor 12. After execution of any of the commands, 709A-709N, has been completed, control is returned to main processing program 700.

In the event that the present mode is not the 80 character mode, 703, buffer B3 710 is checked for new data, 710. If no new data exists in buffer B3, the contents of buffer B1, 40 characters, is displayed, 711, on display circuit 413 and control is returned to main processing programs. If new data exists in buffer B3, the new data is checked for a mode change request 712. If no mode change request exists then the contents of buffer B1, is displayed 711 on display circuit 413. If a mode change was requested then the new mode must be the 80 character mode and terminal 10 is set up accordingly, 713, after which control is returned to main processing program 700.

Assuming that terminal 10 has been reconfigured as described above, the user at terminal 10 awaits a signal indicating that the computer that he or she called has answered. Returning to FIG. 5, when an off-hook condition occurs, step 510, at the called computer location 13A, switch processor 12 removes, step 511, the ringback removed signal and sends an ANSWERED message to terminal 10 and sends a ringer-off signal to called computer 13A (step 621). At terminal 10 the message ANSWERED is displayed preceded by a carriage return/line feed (CR/LF). Thereafter, 512, at terminal 10 location and called computer 13A location data modules DTDM 403 and jPDM 21, respectively, handshake with each other and establish a data connection therebetween and commence data transmission, 513, over information channel I2.

The conclusion of a data call occurs when a user hits the disconnect key, 513, on keyboard 404. Data terminal 10 causes a DISCONNECT message to be displayed on display circuit 413 and an on-hook signal 515 to be sent to switchprocessor 12. Data terminal 10 then returns to the idle state.

At switch processor 12, the call sequence program tears down the connection between terminal 10 and the called computer 13A. A DISCONNECT message is sent, step 515, to computer 13A which then returns to the idle state. Note, a call in progress can also be terminated in response to a disconnect message from switch processor 12, or if a data terminal ready signal goes low, or if the data terminal transmits a continuous break signal for more than two seconds.

In another embodiment of the invention requiring only a terminal 10 and controller (processor 12), the system may or may not have computers 13A–13N or switch 11, terminal 10 can be reconfigured in response to any of a number of reconfiguration signals (similar to a dialing signals). In such an embodiment table 8 would contain those predetermined operating parameters which would be sent to reconfigure the terminal in accordance with the specific reconfiguration signal received from the terminal. The program at controller or switch processor 12 for such an embodiment is a straightforward simplified version of the program illustrated in FIG. 6. The reconfiguration command received at terminal 10 would be decoded and processed in the same manner as previously described and terminal 10 would be reconfigured accordingly.

What has been disclosed is merely illustrative of the present invention. Other arrangements and methods can be implemented by those skilled in the art without departing from the spirit and scope of the present invention.

What is claimed is:

1. A communication system comprising a terminal, a system controller, and a plurality of communication devices switchably connectable to said terminal, said terminal including
   means for generating and transmitting one of a group of reconfiguration signals to said controller identifying one of said plurality of communication devices to which a connection is requested, and
   means responsive to a predetermined terminal reconfiguration command received from said controller including parameter data for reconfiguring an operating parameter of said terminal in accordance with said reconfiguration command and
   said controller including
   means solely responsive to said one of a group of reconfiguration signals received from said terminal for selecting said parameter data and for transmitting it to said terminal in said predetermined reconfiguration command, said selecting and transmitting means operable prior to said controller establishing communication between said terminal and one of said plurality of communication devices specified in said one of a group of reconfiguration signals.

2. The communication system of claim 1 wherein said reconfiguration signal is a dialing signal which selects which one of said plurality of communication devices is to communicate with said terminal.

3. The communication system of claim 1 wherein said terminal includes a display circuit, said predetermined reconfiguration command includes an operating parameter of said display circuit, and said reconfiguring means of said terminal reconfigures said display circuit in response to said display circuit operating parameter.

4. The communication system of claim 1 wherein said reconfiguration command includes a non-communication terminal specific operating parameter and said reconfiguring means is responsive to said terminal operating parameter for reconfiguring said terminal.

5. A controller adapted for controlling a communication system including a terminal and a plurality of communication devices switchably connectable to said terminal, said controller comprising
   means for receiving any one of a group of terminal reconfiguration signals from said terminal each identifying a specific reconfiguration request at said terminal and
   means responsive solely to said reconfiguration signal for selecting and transmitting a predetermined terminal reconfiguration command to said terminal including parameter data specifying an operating parameter to be reconfigured in accordance with said specific reconfiguration request, said selecting and transmitting means operable prior to establishing communication between said terminal and one of said plurality of communication devices specified in said specific reconfiguration request.

6. The controller of claim 5 wherein
   said configuration signal received from said terminal identifies one of said plurality of communication devices to which said terminal requests a connection and
   said predetermined reconfiguration command includes a communication parameter to reconfigure said terminal to enable compatible communications between said terminal and said one of said plurality of communication devices.

7. The controller of claim 6 wherein said configuration signal is a dialing signal which selects which one of said plurality of communication devices is to communicate with said terminal.

8. A method of reconfiguring a communication system including a terminal, a system controller and a plurality of communication devices switchably connectable to said terminal, comprising the steps of:
   generating and transmitting one of a group of reconfiguration signals to said controller identifying one of said plurality of communication devices,
   selecting a predetermined parameter solely in response to one of said group of reconfiguration signals and transmitting it from said controller to said terminal in a predetermined terminal reconfiguration command, said selecting and transmitting step operable prior to said controller establishing communication between said terminal and one of said plurality of communication devices specified in said one of a group of reconfiguration signals, and
   reconfiguring an operating parameter at said terminal in response to said predetermined reconfiguration command.

9. The method of claim 8 wherein said reconfiguration signal is a dialing signal for selecting which one of said plurality of communication devices is to communicate with said terminal.

10. A communication terminal for use in a telephone communication system including a plurality of communication devices and a system controller for controlling connection between said terminal and one of said plurality of communication devices, said terminal comprising
   means for generating and transmitting to the telephone system controller one of a group of reconfiguration signals each identifying a specific reconfiguration request requesting an operating parameter required for operating said terminal and
   means responsive to a predetermined terminal reconfiguration command received from said telephone system controller after a communication connection is established thereto, said reconfiguration command received in response to said one of a group of reconfiguration signals including data for reconfiguring an operating parameter of said terminal in accordance with said reconfiguration command.

11. The communication terminal of claim 10 wherein said reconfiguration command specifies a noncommunication terminal specific operating parameter required for operating said terminal in a local mode.

* * * * *